United States Patent
Cousin et al.

(10) Patent No.: US 7,653,788 B2
(45) Date of Patent: Jan. 26, 2010

(54) CACHE COHERENCY IN A SHARED-MEMORY MULTIPROCESSOR SYSTEM

(75) Inventors: Jean-Philippe Cousin, Grenoble (FR); Jean-Jose Berenguer, Grenoble (FR); Gilles Pelissier, Seyssins (FR)

(73) Assignee: STMicroelectronics SA, Montrouge (FR)

( * ) Notice: Subject to any disclaimer, the term of this patent is extended or adjusted under 35 U.S.C. 154(b) by 316 days.

(21) Appl. No.: 11/397,945

(22) Filed: Apr. 4, 2006

(65) Prior Publication Data

US 2006/0259705 A1    Nov. 16, 2006

(30) Foreign Application Priority Data

Apr. 4, 2005    (FR)    ................... 05 03320

(51) Int. Cl.
    *G06F 12/00*    (2006.01)
(52) U.S. Cl. ................ 711/141; 711/147; 711/150; 711/151; 711/158
(58) Field of Classification Search ........... 711/141, 711/146, 147, 150, 151, 158
See application file for complete search history.

(56) References Cited

U.S. PATENT DOCUMENTS 5,860,114 A * 1/1999 Sell ................ 711/146
6,874,065 B1   3/2005 Pong et al.
7,047,320 B2 * 5/2006 Arimilli et al. ........ 710/5
7,340,564 B2 * 3/2008 Twomey .............. 711/125
7,434,008 B2 * 10/2008 Shaw ................. 711/146
2003/0120876 A1   6/2003 Hass et al.
2004/0139246 A1 * 7/2004 Arimilli et al. ........ 710/36
2006/0095674 A1 * 5/2006 Twomey .............. 711/125

* cited by examiner

*Primary Examiner*—Christian P Chace
*Assistant Examiner*—Mehdi Namazi (57) ABSTRACT

A method of making cache memories of a plurality of processors coherent with a shared memory includes one of the processors determining whether an external memory operation is needed for data that is to be maintained coherent. If so, the processor transmits a cache coherency request to a traffic-monitoring device. The traffic-monitoring device transmits memory operation information to the plurality of processors, which includes an address of the data. Each of the processors determines whether the data is in its cache memory and whether a memory operation is needed to make the data coherent. Each processor also transmits to the traffic-monitoring device a message that indicates a state of the data and the memory operation that it will perform on the data. The processors then perform the memory operations on the data. The traffic-monitoring device performs the transmitted memory operations in a fixed order that is based on the states of the data in the processors' cache memories.

20 Claims, 2 Drawing Sheets

CACHE COHERENCY IN A SHARED-MEMORY MULTIPROCESSOR SYSTEM

TECHNICAL FIELD OF THE INVENTION

This invention relates in general to the design of digital systems and, in particular, the design of digital systems with multiple processors sharing one memory.

BACKGROUND OF THE INVENTION

A certain number of digital systems include several processors in order to provide improved performance, especially in order to make up for the frequency limitations of a single processor, and in particular for systems on chip. Each processor of such a system can synchronize its operation with the others and can share data by means of read/write operations in memory locations shared by all of the processors. In order to furnish access to the data with shortened response times and a large bandwidth, each processor has a cache memory containing a local copy of data from a shared memory location. Since the various processors may contain duplicate copies for the same memory location in their cache memory, it is necessary to maintain coherency between these cache memories. This coherency can be provided through software or hardware. The hardware solution makes it possible to optimize the exchange of data while reducing the cost of synchronization. In this way, whenever data in a cache memory is modified by a processor, the other cache memories of the other processors are automatically updated to accurately reflect this change.

Figure 1:
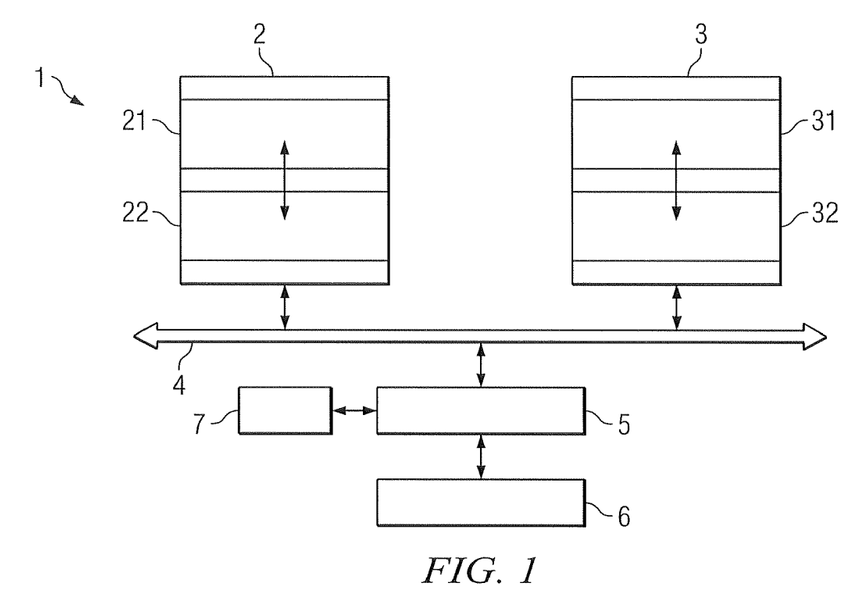
FIG. 1 shows a digital system according to the prior art.

FIG. 1 shows a method for monitoring traffic (snooping method) along a global bus connecting the cache memories of the processors to a shared memory by means of a bridge. The digital system 1 of FIG. 1 has processors 2 and 3 equipped respectively with processing units 21 and 31 and cache memories 22 and 32. The system 1 also has a bus 4 designed to facilitate the operations for producing coherency between the cache memories 22 and 32. The bus 4 connects the processors 2 and 3 to the bridge 5, the bridge 5 itself being connected to a shared memory 6 and to an input/output channel 7. The interface of each processor with the bus has 120 bits, 64 bits being reserved for the data and 56 bits being reserved for an address and the operation code.

The bridge 5 includes a memory controller as well as a logic circuit in order to conduct the traffic-monitoring transactions along the bus 4. The processors 2 and 3 and their cache memories 22 and 32 manage the memory traffic-monitoring transactions along the bus 4. The processors 2 and 3 use traffic-monitoring data to keep the contents of their cache memory coherent with the cache memory of the other processors.

A system such as this has disadvantages. The updating of the cache memories of the processors requires that the shared memory be accessed numerous times. The processors' response time to an external request is thus increased, the traffic along the bus is heavy and the system's overall electrical consumption is high.

SUMMARY OF THE INVENTION

To address the above-discussed deficiencies of the prior art, an object of the present invention aims to minimize one or more of these disadvantages. Therefore, the invention relates to a method for producing coherency between the cache memories of several processors and a shared memory, comprising the following steps:

a processor determines the necessity of an external memory operation for data to be maintained coherent and transmits a cache coherency request to a traffic-monitoring device;

the traffic-monitoring device transmits memory operation information to all of the processors, which contains the address of the data to be maintained coherent;

each processor determines the presence of the data in its cache memory and determines the need to carry out a memory operation for making this data coherent;

each processor transmits to the traffic-monitoring device a message indicating the state of the data in its memory cache and indicating the memory operation that it is going to carry our for this data;

each processor carries out the memory operation indicated to the traffic-monitoring device;

the traffic-monitoring device carries out the transmitted memory operations according to a fixed order based on the state of the data in the cache memories of the processors.

According to one alternative:

the state of the data in the cache memories of the processors is defined according to the MESI protocol;

when a processor processes a storage request related to data in state S, E or M in its cache memory, it writes the data from the request in its cache memory, positions the state of these data at M and does not write this data in the shared memory in the absence of memory operation information on this data;

when a processor receives information about a memory operation on data in state M in its cache memory, it transmits to the traffic-monitoring device a message indicating that it is going to write in the shared memory, the traffic-monitoring device then writes the data into the shared memory, and then the indicated memory operation into the memory operation information.

According to another alternative, a processor determines the necessity of an external memory operation for data not having to be maintained coherent, the processor transmits an external memory operation request to the traffic-monitoring device without any cache coherency request, and the traffic-monitoring device carries out this memory operation between the processor and the shared memory on a priority basis.

The invention also relates to a digital processor including:

a cache memory;

an addressable data exchange interface in the cache memory;

a traffic-monitoring information exchange interface;

an external memory operation request interface;

a memory operation management unit, able to sequentially determine a need to make the cache memory coherent and to issue a cache coherency request to the external operation request interface, to process memory operation information received by the traffic-monitoring interface and to identify a data address, to determine the presence and the state of the data at the address identified in its cache memory, to transmit to the traffic-monitoring interface an indication of the memory operation that it is going to carry out on the addressable data exchange interface in the cache memory, and to transmit the indicated memory operation to the addressable data exchange interface.

According to one alternative, the state of the data in the cache memory is defined according to the MESI protocol and the memory operation management unit updates the state of the data of its cache memory based on the memory operation information received by the traffic-monitoring interface and memory operations carried out by the processor.

According to yet another alternative, a processor is used:
including a first register storing an address of the cache memory and one framing bit of this address, and a second register storing one bit;
in which, during loading and writing of data to an address of the cache memory, said loading and said writing being associated with each other:
the memory operation management unit is able to:
order a reading of the data in the cache memory, store said address in the first register, set the framing bit and issue a cache coherency request;
acceptance-test the write memory operation information in response and determine if the information requires that the processor write the data;
if the information requires that the processor write the data, verify if its framing bit is set, transmit an write operation indicator to the traffic-monitoring interface, write the data into its cache memory, unset its framing bit and record the success of the write operation in the second register;
if the information requires that another processor write the data, set the framing bit, record the failure of the write operation in the second register and restart the associated operations for loading and writing the data.

The invention also relates to a traffic-monitoring device including:
an interconnecting circuit between a shared memory and the cache memories of processors able to acceptance-test memory operations transmitted by the processors;
a data coherency and transfer management circuit able to process external memory operation requests from several processors and to select one of them, to transmit to all of the processors information containing the address of the data to be maintained coherent, which corresponds to the selected request, said circuit being able to process a message from each processor indicating the state of the data in its cache memory and indicating the memory operation that it is going to carry out for this data, said circuit being able to order the connecting circuit to carry our the transmitted memory operations according to a fixed order based on the state of the data in the memory caches of the processors.

According to one alternative, the data coherency and transfer management circuit is able to receive from a processor a memory operation request for data not having to be maintained coherent, and to order the connecting circuit to carry our this memory operation between the processor and the shared memory, on a priority basis.

The invention further relates to a digital system comprising:
a traffic-monitoring device as defined above;
several processors as defined above, whose traffic-monitoring information exchange and memory operation request interfaces are connected to the traffic-monitoring device and whose addressable data exchange interfaces are connected to the connecting circuit of the traffic-monitoring device;
a general shared memory connected to the connecting circuit of the traffic-monitoring device.

According to yet another alternative, the system is integrated as a system-on-chip.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of a least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Other characteristics and advantages of the invention will be clearly deduced from the following description thereof, given for illustrative and non-limiting purposes, with reference to the appended drawings, in which like reference numerals represent like parts, and in which.

DETAILED DESCRIPTION OF THE INVENTION

Figure 2:
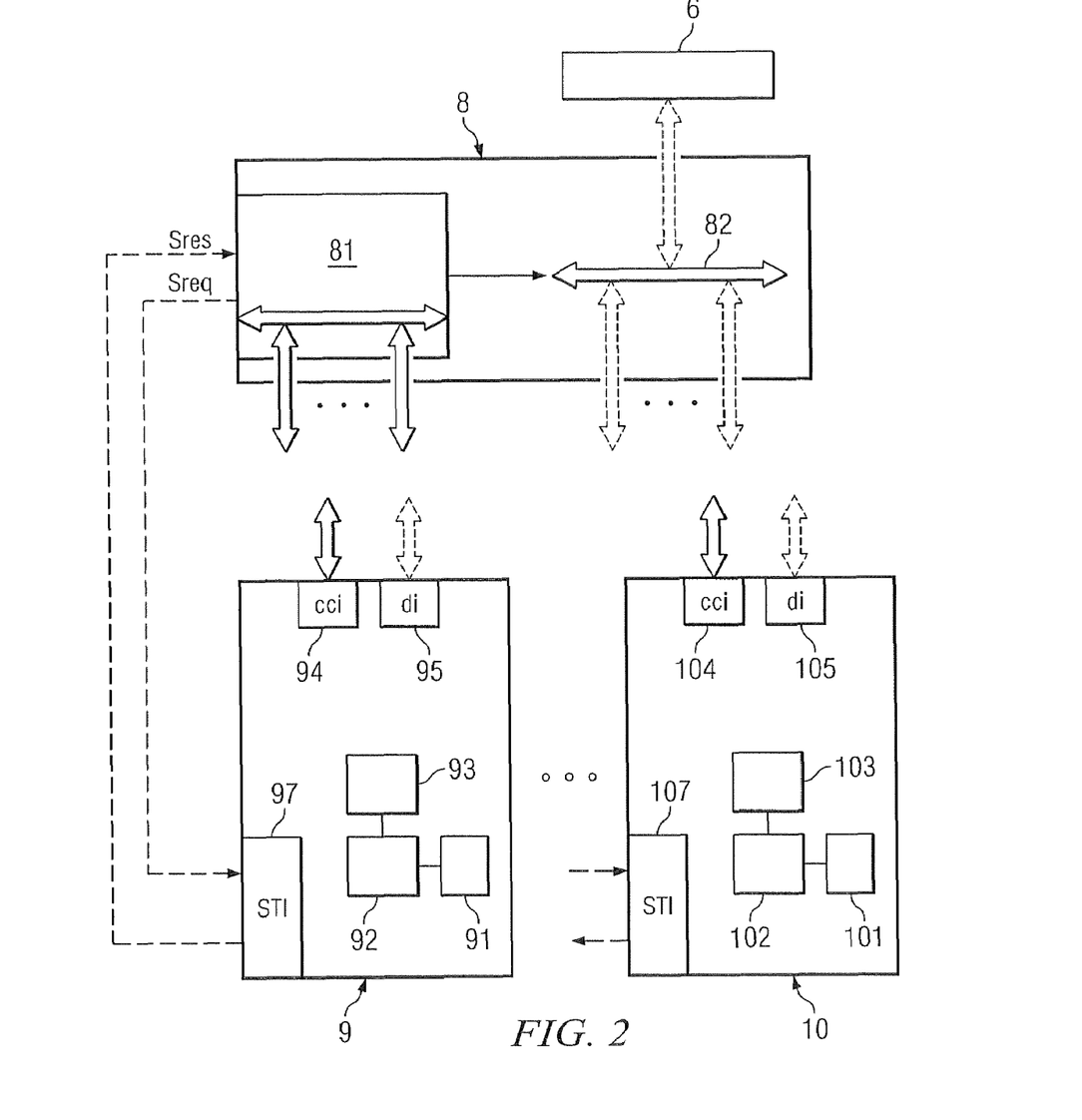
FIG. 2 shows a digital system implementing the invention.
Figure 3:
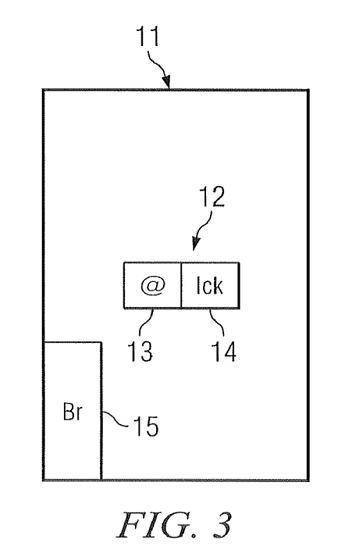
FIG. 3 shows an alternative processor according to the invention.

FIGS. 2 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital system with multiple processors sharing one memory.

The invention proposes to separate the system into two elements: specific processors associated with the cache coherency system (usable in a single-processor environment) and a traffic-monitoring device managing the cache coherency operations between these processors and a shared memory. In a multiprocessor environment, these two interfaces operate in a coordinated manner. In a first phase, one processor requires an external memory operation and transmits a so-called coherency request to the SIU by means of a specific interface. The SIU acceptance-tests this request and informs the other processors associated with the cache coherency system. Each processor that receives the request sends to the SIU the memory operation that is going to be sent to a data interface and sends the memory operation to this data interface. The SIU then determines the order of the memory operations necessary for maintaining the coherency of the data between the cache memories of the processors and carries them out on a priority basis. In a second phase, the SIU validates the external memory operation of the processor and carries out the data transfer required by this operation.

FIG. 2 shows a digital system implementing the invention. This system includes a shared memory 6, an SIU 8 and processors 9 and 10.

The shared memory 6 may be of any type: an L2 cache memory or a standard RAM memory. The traffic-monitoring mechanism according to the invention can be applied regardless of the structure of the shared memory 6.

The processors 9 and 10 possess, respectively:
- central processing units 91 and 101 (hereinafter referred to as CPU);
- memory operation management units 92 and 102 (hereinafter referred to as LSU);
- cache memories 93 and 103. The cache memories 93 and 103 are, for example, L1 memories storing instructions and data.
- external memory operation request interfaces 94 and 104 (hereinafter referred to as CCI);
- data exchange interfaces 95 and 105 (hereinafter referred to as DI);
- traffic-monitoring exchange interfaces 97 and 107 (hereinafter referred to as STI interfaces).

The processors used may be 32-bit Very Long Instruction Word processors having a 32-kilobyte, 4-way data cache memory. The processors 9 and 10 use a modified data management system usually referred to as write-back in English; in order to reduce the exchanges between the cache memories 93 and 103 and the shared memory 6, when data is modified in a cache memory, it is not written into the shared memory 6 as long as access to this data has not been requested. When access to this data is requested, this access is preceded by the modified data of the cache memory being written into the shared memory 6.

The SIU 8 includes:
- a data coherency and transfer management circuit 81;
- an interconnecting circuit 82 between the DI 95, 105 and the shared memory 6.

The CCI interfaces 94 and 104 and the STI interfaces 97 and 107 are connected to the circuit 81. The DI interfaces 95 and 105 are connected to the circuit 82. Although the example shown includes only two processors 9 and 10, those skilled in the art will easily know how to implement the invention for a larger number of processors.

In a manner known per se, the LSU 92 carries out an internal memory operation on the cache memory 93 when it determines that an external memory operation is not necessary. The operation of the system will be described when the processor 9 initiates an external memory operation.

The LSU 92 receives a memory operation request coming from the CPU 91. This request furnishes an operation code determining if the memory operation is a loading or storing operation, and an address at which the operation must be carried out. The request likewise specifies if a coherency must be guaranteed for the data stored at this address.

Preferably, each page of the cache memory 93 has an attribute indicating if its contents must be made coherent or not. The per-page management of the cache memory data adds a great deal of flexibility while making it possible to differentiate between blocks of data, particularly in order to determine if the data can be made coherent. The LSU 92 verifies if the address indicated in the memory operation request is present in the cache memory 93 and reads the state of the data at this address. A state can be associated with each line of the cache memory 93. This state, for example, is defined by MESI protocol markers. By way of reminder, according to the MESI protocol, states are associated with data in the cache memory of a processor. These states have the following meanings:

State M, for modified, means that the cache memory of the processor is the only owner of a modified and valid copy of the data; neither the cache memories of the other processors or the main shared memory have this modified copy of the data.

State E, for exclusive, means that the cache memory of the processor and the main shared memory are owners of a copy of the valid data, but that the cache memories of the other processors do not hold this copy.

State S, for shared, means that the data in the cache memory of the processor is possibly held by the cache memory of other processors and that this data is also stored in the main shared memory.

State I, for invalid, means that the data in the cache memory of the processor is not valid.

Based on the state of the data and the type of memory operation requested, the LSU 92 determines whether an external memory operation is necessary in order to carry out the requested memory operation and to guarantee the coherency of the data.

The following table furnishes the decision criteria of the LSU 92.

| Requested Memory Operation | Caching OK | Page Coherency Attribute | State of the Data | CCR Transfer Function | External Operation Necessary |
|---|---|---|---|---|---|
| Loading | No | No | V | No | Yes |
| Loading | Yes | No | I | No | Yes |
| Loading | Yes | No | M-E-S | No | No |
| Storing | No | No | V | No | Yes |
| Storing | Yes | No | I | No | Yes |
| Storing | Yes | No | S | No | Yes |
| Storing | Yes | No | M-E | No | No |
| Loading | No | Yes | V | Yes | Yes |
| Loading | Yes | Yes | I | Yes | Yes |
| Loading | Yes | Yes | M-E-S | No | No |
| Storing | No | Yes | V | Yes | Yes |
| Storing | Yes | Yes | I | Yes | Yes |
| Storing | Yes | Yes | S | Yes | Yes, if an invalidation coming from the SIU is received between the CCR request and corresponding Sreq information. |
| Storing | Yes | Yes | S | Yes | No, if no invalidation coming from the SIU is received between the CCR request and corresponding Sreq information. |
| Storing | Yes | Yes | M-E | No | No |

When the LSU 92 determines that a coherent operation in external memory was necessary, it transmits a CCR external memory operation request to the circuit 81 by means of the CCI interface 94. The complete information concerning the memory operation is preserved in the processor 9.

In the case where the external memory operation necessitates cache coherency, the circuit 81 arbitrates between this CCR request for cache coherency and CCR requests transmitted by other processors. This CCR request is placed in a FIFO, then processed by the circuit 81. Because of the serialization of the various CCR requests, modifications of the same data unit in the cache memories of various processors does not generate conflicts. A CCR request is processed by the circuit 81 at each cycle.

The CCR request includes a request validation bit, operation code bits defining the external memory operation requested by the processor, the characteristics of the operation and physical address bits indicating the memory location on which the memory operation must be carried out. The address bits may contain only representative most significant bits (e.g., lined up along the edge of a line of the cache memory).

A possible encoding of a CCR request operation code may be as follows:

| Operation | CCR Request Bits | | Comments |
|---|---|---|---|
| | 3 | 20 | |
| Requested | | | |
| NOP | X | 000 | Memory operation not coming from a processor (e.g., DMA or external component) |
| Loading | X | 001 | Loading Operation |
| Storing | X | 010 | Storing Operation |
| Address Purge | X | 011 | Address Purge Operation: enables the transfer of data from the internal cache memory to the shared memory. |
| Reserved | | 1xx | Reserved for operations yet to be defined. |
| Invalidate | 1 | Xxx | Invalidate data during loading, storing or purging. |

The circuit 81 sends a signal indicating that it does or does not accept the CCR request at the CCI interface 94. Thus, the protocol used by the CCI interface 94 is of the request/agreement type.

The circuit 81 verifies if the CCR request does not correspond to another operation (e.g., a read operation) in progress at the same address. If there is no operation in progress at the same address, the circuit 81 determines if another memory operation must be carried out in order to maintain the coherency of the data at the address indicated in the CCR request. Thus, if the CCR request of the processor 9 requires a memory operation on data that is stored at state M in the cache memory 103 of the processor 10, the circuit 81 determines that this data of the cache memory 103 must be written beforehand into the shared memory 6, in order to guarantee its coherency.

The circuit 81 transmits Sreq information to all of the processors connected to it. The Sreq information is, in particular, transmitted to the STI interfaces 97 and 107 of the processors 9 and 10. The STI interfaces 97 and 107 include, for example, FIFOs connected respectively to the LSU 92 and 102 for buffering the Sreq information. Sreq information includes the address at which the memory operation is to be carried out, a validation bit for each processor, identification bits for the processor where the CCR request originated, and an operation code. The operation code may be limited to a bit signifying that the data at the address indicated in the Sreq information is or is not invalid. A bit requesting the invalidation of the data shifts the state of the data to I in the cache memory.

By means of its STI interface, each processor sends a signal to the circuit 81, indicating whether or not it accepts the Sreq information. Thus, the protocol used for the Sreq information is of the request/agreement type. Therefore, CCR request progresses along a pipeline of the circuit 81 only if all of the processors have accepted the associated Sreq information. In particular, a processor can refuse Sreq information if its Sreq information storage FIFO is full.

The LSU 92 and 102 process the Sreq information arranged at the head of the FIFO queue. The LSU of a processor determines if it is its CCR request or that of another processor that is the originator of the Sreq information. The STI interfaces 97 and 107 may have a validation input to which the circuit 81 applies a signal, if the processor is the originator of the Sreq information. For the processor 9, the LSU 92 determines whether it is the originator of the Sreq information, and therefore the state of the cache memory data 93 is not tested. The processor 9 has knowledge of the operation that will be carried out on its DI interface 95. The complete set of information preserved in the processor 9 is then used to process the Sreq information. For the processor 10, which is not the originator of the Sreq information, the presence and state of the data indicated in the Sreq information are verified in the cache memory 103.

Based on the result of the verifications of its LSU, each processor then determines the memory operation that it will carry out on its DI interface in order to guarantee the cache coherency. The processor that issued the CCR request determines that it can carry out its memory operation by means of its DI interface. A processor that possesses the data indicated in the Sreq information at the modified state determines that its DI interface must write into the shared memory 6.

Next, each processor transmits to the circuit 81 an Sres message in response to the Sreq information. Each Sres message includes an operation code indicating the memory operation that the processor is about to carry out on its DI interface (reading, storing or no operation) and a validation bit indicating if the data item is or is not in its cache memory. The Sres messages are transmitted according to the processing order for the Sreq information in each processor. The processors then carry out the memory operation on their DI interface, as indicated in their Sres message.

The encoding of the operation code of an Sres message may be as follows:

| Operation | 1:0 | Comments |
|---|---|---|
| NOP | 00 | No operation will be carried out on the exchange interface. |
| Read | 01 | The processor is about to carry out a read operation on its data exchange interface. |
| Write | 10 | The processor is about to carry out a write operation on its data exchange interface. |
| Read + Write | 11 | The process is about to carry out a read and write operation on its data exchange interface (read + line eviction). |

Based on the Sres messages received and the state of the data determined for each cache memory, the circuit 81 arbitrates between the memory operations carried out by the DI interfaces of the processors and an advance scheduling of these operations. For example, when the processor 9 is the originator of the Sreq information and indicates a read operation in its Sres message, and when the processor 10 indicates a write operation in its Sres message (which means that it possesses the data in modified state), the circuit 81 orders the circuit 82 to first carry out the operation of processor 10 writing into the shared memory 6, and then orders the circuit 82 to carry out the operation of reading the data from processor 9 in the cache memory 103 of the processor 10. In this way, the data in the cache memory 103 and in the shared memory 6 is coherent prior to the read operation of the processor 9. Thus, the data included in the cache memories 93 and 103 is transmitted to the data exchange circuit 82 only when the data address has first been transmitted to the processors by the circuit 81. In this way, the buffering of the cache memory data 93 and 103 in the SIU 8 is reduced and the coherency of the data is guaranteed implicitly. The state of the cache memory data 93 and 103 is then modified based on the memory operations carried out on the DI interfaces 95 and 105. The processors are not influenced by the transfer arbitrations.

For a given memory operation requested by the LSU 92, the operations carried out by the processors 9 and 10 are summarized in the following table, according to various hypothetical cases.

| P9: Test Cache | Page Attribute (cached or not) | P9: State Cache | P10: State Cache | P9: Request CCR | P9: Request Sreq | P9: MESS Sres | P10: Request Sreq | SIU Arbitration | Comments |
|---|---|---|---|---|---|---|---|---|---|
| CR | | | | | | | | | No CCR request. Data loaded from memory 93 |
| CM | No | | I | Loaded | Invalid | Read | NOP | P9 | Reading of non-coherent data may lead to its invalidation. |
| | | | S-E > I | Loaded | Invalid | Read | NOP | P9 | |
| | | | M > I | Loaded | Invalid | Read | Write | P10/P9 | P10 data is previously written into M6. |
| | Yes | I > E | I | Loaded | | Read | NOP | P9 | No other process or has the valid data. Thus, the state of the P9 data passes to S. |
| | | I > S | S-E > S | Loaded | | Read | NOP | P9 | At least one other process or has the valid data. Thus, the state of the P9 data passes to S. |
| | | I > S | M > S | Loaded | | Read | Write | P10/P9 | P10 data previously written into M6. State of the data passes to S in P9 and P10. |
| S | No | I | I-E-S > I | Stored | Invalid | Stored | NOP | P9 | Sres message from P9 placed in a FIFO. P10 cache memory invalid. |

-continued

| P9: Test Cache | Page Attribute (cached or not) | P9: State Cache | P10: State Cache | P9: Request CCR | P9: Request Sreq | P9: MESS Sres | P10: Request Sreq | SIU Arbitration | Comments |
|---|---|---|---|---|---|---|---|---|---|
| | | | M > I | Stored | Invalid | Stored | Written | P10/P9 | Sres message from P9 placed in a FIFO. P10 data written into M6. |
| | Yes | S > I | I-S > I | Stored | Invalid | Stored | NOP | P9 | P10 invalidates the data from P9 prior to issuing the Sreq information. |
| | | S > M | I-S > I | Stored | Invalid | NOP | NOP | NOP | No invalidation of data prior to issuing Sreq information. Storage of data managed internally in P9. P9 invalidates P10. |
| | | M-E > M | | | | | | | Storage of data managed internally in P9. |

P9 and P10 identify the processors 9 and 10, and M6 identifies the shared memory.

In the first column, CR signifies successful internal loading, CM signifies failed internal loading, and S signifies storage. The second column indicates if the data must be made coherent. The third and fourth columns indicate the MESI states of the data in cache memory before and after the memory operation. A P10 write operation corresponds to storage in the shared memory 6.

In the case where the external memory operation does not necessitate cache coherency, e.g., during the transfer of an instruction, the circuit 81 orders the circuit 82 to carry out the requested transfer between the shared memory 6 and the DI interface 96. A transfer such as this then short-circuits the processing associated with the cache coherency in the SIU.

A processor suitable for implementing the invention requires only minor modifications, and its additional cost is thereby limited. Therefore, this processor can also be used economically in a single-processor system. Only a few additional bits are necessary in order to implement the cache coherency, without having to manage the transaction of the addressable data.

Since an operation on a DI interface of a processor follows the exchanges of it's STI and CCI interfaces, each processor carries out its operations without any restraints associated with memory management and the STU 8 manages the cache coherency by using only a few bits, which guarantees that circuit 81 has a simplified structure and that there is a limited time period between a cache coherency request Cc and corresponding Sreq information.

Each processor can access the data contained in the cache memory of the other processors by means of the SIU 8. The coherency of the cache memories through this type of access reduces the number of times that the shared memory 6 is accessed. The bandwidth on the bus of the shared memory 6 is thereby arranged to facilitate other transfers. The exchanges with the shared memory 6 are likewise limited, and the electrical consumption of the system is considerably reduced.

A processor can also easily transfer the data from its cache memory in order to switch to another task, without involving the shared memory 6.

The number of processors included in the system can be easily modified, without entailing modifications to the programming of applications using the system.

FIG. 3 shows an alternative processor 11 supporting instructions of the linked load and conditional store type. The purpose of these instructions is so that a sequence linking a processor's read and write operations cannot be broken by another processor intermediately writing over this data.

The processor 11 has a jump register 15 and an address latch register 12 storing the physical address 13 and a framing bit 14.

The execution of a linked load instruction occurs in the following way: the physical address and the framing bit are written into the latch register of the processor. Regardless of the contents of the latch register, the execution of the linked load updates the address and sets the framing bit to 1 in the latch register. In order to guarantee cache coherency, the framing bit cannot be set to 1 by direct access.

The execution of a conditional store instruction occurs in the following way: setting of the framing bit is verified. If the framing bit is at 0, the associated bit of the jump register passes to 0. It might likewise be anticipated to verify the address in the latch register.

The framing bit is set to 0 in the following cases:
when the processor that executes a conditional store instruction sets the framing bit to 0 and updates the associated jump register;
when the processor writes a 0 in the framing bit;
when a cache line is removed from the cache memory and corresponds to the address contained in the latch register;
when another processor or an external device writes to the address that is stored in the latch register.

When the data is in state S, the processor transmits a CCR request during execution of the associated instructions. The decision to carry out the write operation is made on the basis of the result of the Sreq information received from the SIU.

For the states E and M of the data, the associated instructions are executed in the processor without any CCR request and thus without waiting to receive Sreq information from the SIU.

The use of these types of instructions is clear for the SIU. A linked load is seen as a conventional load by the SIU. A conditional store is seen as a conventional store by the SIU. The SIU guarantees the link between these operations: if a read/write request of data at the same address by a processor is arbitrated after a linked load of another processor, this request is blocked in the SIU as long as this linked load has not been completed.

The following syntax can be used for these instructions:
For a linked load:
    Ldwl $ri=[$Rj]
The addressed pointed to by Rj is placed in the latch register.

For a conditional store:
    Stwl $bi, [$Ri]=Rj
If the content of the latch register is at zero, the bit of the jump register is reset to 0. If the content of the latch register is at 1, the read operation is carried out and the framing bit is set to zero.

These types of instructions, for example, can be used to produce several increments of a variable by means of several processors. Therefore, these types of instructions aim to prevent two processors from simultaneously reading the same variable, then writing the variable, the incrementing of the variable by one processor therefore not being taken into account by the other processor.

Thus, in order to increment a variable twice with two separate processors, the method using these types of instructions is as follows:

Each processor executes an associated read instruction on the variable. The physical address of the variable and a framing bit at 1 are stored in its latch register. The variable is at state S in the cache memory of each processor.

Each processor internally increments the variable and executes a conditional store instruction. Since the variable is at state S, each processor transmits a cache coherency request. The SIU arbitrates between their requests and transmits Sreq information after having arbitrated between the write operations. Thus, a first processor is selected by Sreq information to carry out the write operation. The first processor determines that its framing bit is at 1 and thereby concludes that the variable has not been modified in the interim. The first processor then writes the incremented variable into its cache memory and marks it at state M. The second processor, having received the Sreq information corresponding to this write operation, invalidates the variable in its cache memory and places its framing bit at 0. The SIU next transmits Sreq information and selects the second processor to carry out its write operation. Since the first processor has the variable at state M, it transmits a Sres message in order to update the writing of the variable and places its jump register at 1. The second processor observes that the data associated with the address stored in its latch register is invalid and thus cancels its write operation. The second processor updates the jump register in order to note that the write operation has failed (state 0). As long as this jump register notes the failure of the write operation, the second processor will repeat a sequence linking a read operation and a write operation until it succeeds.

When a variable in a cache memory of a processor is indicated to be at E or M, the conditional store instruction is processed in the processor internally and the framing bit is placed at 1.

What is claimed is:

1. A method of making cache memories of a plurality of processors coherent with a shared memory, comprising:
   determining at a first of the processors that an external memory operation is needed for data within a respective one of the cache memories to be maintained coherent with data within remaining ones of the cache memories and transmitting a cache coherency request to a traffic-monitoring device;
   transmitting memory operation information from the traffic monitoring device to the plurality of processors, the memory operation information comprising an address of the data to be maintained coherent;
   at each of the plurality of processors:
   determining whether the data to be maintained coherent is present in its cache memory;
   determining whether a memory operation is needed to make the data coherent;
   transmitting to the traffic-monitoring device a message indicating a state of the data in its cache memory and indicating the memory operation that the processor is going to perform;
   performing the memory operation indicated to the traffic-monitoring device; and
   ordering performance of two or more transmitted memory operations from two or more of the processors and relating to the data at the traffic monitoring device according to an order based on the indicated states of the data identified by the two or more processors to maintain coherency between the cache memories.

2. The method of claim 1, further comprising, at a second of the plurality of processors:
   storing the data to be maintained coherent in its cache memory; and
   setting the state of the data to indicate that the data has been modified.

3. The method of claim 2, wherein:
   determining whether a memory operation is needed comprises determining at the second processor that a write memory operation is needed; and
   transmitting a message to the traffic-monitoring device comprises transmitting a message indicating that the data is modified and indicating that the second processor will perform the write memory operation.

4. The method of claim 1, further comprising storing, at the traffic-monitoring device, external memory operation requests in a first-in, first-out memory.

5. The method of claim 1, further comprising:
   at one of the plurality of processors:
      determining that a second external memory operation is needed for second data in its cache memory, the second data not required to be maintained coherent; and
      transmitting an external memory operation request to the traffic-monitoring device without any cache coherency request; and
   performing, at the traffic-monitoring device, the second external memory operation on a priority basis.

6. The method of claim 1, wherein:
   the state of the data in each of the cache memories is defined according to a MESI protocol;
   when each processor processes a storage request related to data in an S, E, or M state in its cache memory, the processor writes the data from the storage request into its cache memory, positions the state of the written data at the M state, and does not write the written data into the shared memory in an absence of memory operation information associated with the written data; and
   when each processor receives information about a memory operation on data in the M state in its cache memory, the processor transmits a message to the traffic-monitoring device indicating that the processor is going to write the data in the M state into the shared memory, and the traffic-monitoring device writes the data into the shared memory before the memory operation is performed.

7. The method of claim 1, further comprising one of the processors accessing data in the cache memory of another of the processors using the traffic-monitoring device.

8. A processor, comprising:
   a memory; and
   a management unit operable to:
      receive memory operation information from a traffic-monitoring device including coherency management logic maintaining coherency between the memory, an other memory in an other processor, and a shared memory shared by the processor and the other processor, the memory operation information comprising an address of data;
      determine whether the data is present in the memory;
      determine whether a memory operation is needed to make the data coherent with a shared memory;
      transmit a message to the traffic-monitoring device indicating a state of the data in the memory and indicating the memory operation relating to the data that the processor will perform; and
      initiating performance of the indicated memory operation under control by the traffic-monitoring device of priority for the indicated memory operation relative to any memory operation by the other processor relating to data with the address.

9. The processor of claim 8, wherein the management unit is further operable to:
   determine that an external memory operation is needed for data in the memory to be maintained coherent; and
   transmit a cache coherency request to the traffic-monitoring device.

10. The processor of claim 9, wherein the management unit is further operable to:
    determine that an external memory operation is needed for second data in the memory, the second data not required to be maintained coherent; and
    transmit an external memory operation request to the traffic-monitoring device without any cache coherency request.

11. The processor of claim 8, wherein the management unit is operable to:
    receive the memory operation information from the traffic-monitoring device;
    determine that a write memory operation is needed for the data associated with the memory operation information to be maintained coherent; and
    transmit to the traffic-monitoring device a message indicating that the data is modified and indicating that the processor will perform a write memory operation.

12. The processor of claim 8, wherein:
    the state of data in the memory is defined according to a MESI protocol; and
    the management unit is further operable to update the state of the data in the memory based on at least one of: the memory operation information and one or more memory operations performed by the processor.

13. A processor, comprising:
    a memory;
    a first register operable to store an address of the memory and one framing bit, and a second register operable to store one bit; and
    a management unit operable to:
       receive memory operation information from a traffic-monitoring device including coherency management logic maintaining coherency between the memory, an other memory in an other processor, and a shared memory shared by the processor and the other processor, the memory operation information comprising an address of data;
       determine whether the data is present in the memory;
       determine whether a memory operation is needed to make the data coherent with a shared memory;
       transmit a message to the traffic-monitoring device indicating a state of the data in the memory and indicating the memory operation relating to the data that the processor will perform; and
       initiate performance of the indicated memory operation under control by the traffic-monitoring device of priority for the indicated memory operation relative to any memory operation by the other processor relating to data with the address, and
       during loading and writing of data to the memory, the loading and writing being associated with each other, order a reading of the data in the cache memory, store the address in the first register, set the framing bit, and issue a cache coherency request;
       acceptance-test the memory operation information and determine if the memory operation information requires that the processor write the data;

if the memory operation information requires that the processor write the data, verify if the framing bit is set, transmit a write operation indicator to the traffic-monitoring interface, write the data into the memory, unset the framing bit, and record a success of the write operation in the second register; and if the information requires that another processor write the data, set the framing bit, record a failure of the write operation in the second register, and restart the operations for loading and writing the data.

14. The processor of claim 8, further comprising:

a data exchange interface operable to transfer data to and from an interconnecting circuit, the interconnecting circuit operable to provide access to the shared memory;

a traffic-monitoring exchange interface operable to receive the memory operation information from the traffic-monitoring device; and an external memory operation request interface operable to provide external memory operation requests from the processor to the traffic-monitoring device.

15. A traffic-monitoring device, comprising:

an interconnecting circuit operable to provide access to a shared memory by a plurality of processors; and a management circuit operable to:

receive a cache coherency request from one of the processors, the cache coherency request associated with data in a memory of the processor;

transmit memory operation information to the plurality of processors, the memory operation information comprising an address of the data;

receive, from each of the processors, a message indicating a state of the data in the processor's memory and indicating a memory operation that the processor is going to perform;

select an order for the indicated memory operations by the processors relating to data at the address based on the indicated states of the data identified by the processors; and cause the interconnecting circuit to carry out the indicated memory operations according to the selected order.

16. The traffic-monitoring device of claim 15, wherein the management circuit is further operable to:

receive an external memory operation request associated with second data from one of the processors without any cache coherency request, the second data not required to be maintained coherent; and cause the interconnecting circuit to carry out the requested external memory operation.

17. The traffic-monitoring device of claim 15, further comprising a first-in, first-out memory operable to store external memory operation requests.

18. A system, comprising:

a shared memory;

a plurality of processors operable to use the shared memory; and a traffic-monitoring device operable to:

receive a cache coherency request from one of the processors, the cache coherency request associated with data in a memory of the processor;

transmit memory operation information to the plurality of processors, the memory operation information comprising an address of the data;

receive, from each of the processors, a message indicating a state of the data in the processor's memory and indicating a memory operation that the processor is going to perform; and order performance of the indicated memory operations based on the indicated states of the data identified by the processors.

19. The system of claim 18, wherein each of at least one of the processors comprises:

a cache memory; and a management unit operable to:

receive the memory operation information from the traffic-monitoring device;

determine whether the data is present in the cache memory;

determine whether a memory operation is needed to make the data coherent with the shared memory;

transmit the message to the traffic-monitoring device indicating the state of the data and indicating the memory operation that the processor will perform; and perform the memory operation indicated to the traffic-monitoring device.

20. The system of claim 18, wherein the shared memory, processors, and traffic-monitoring device are integrated onto a single system-on-a-chip.

* * * * *

UNITED STATES PATENT AND TRADEMARK OFFICE
CERTIFICATE OF CORRECTION

PATENT NO. : 7,653,788 B2 Page 1 of 1
APPLICATION NO. : 11/397945
DATED : January 26, 2010
INVENTOR(S) : Cousin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this

Twenty-eighth Day of December, 2010

David J. Kappos
*Director of the United States Patent and Trademark Office*